(12) United States Patent
Li et al.

(10) Patent No.: US 6,451,715 B2
(45) Date of Patent: Sep. 17, 2002

(54) LOW PERMEABILITY SIDE CURTAIN AIRBAG CUSHIONS HAVING EXTREMELY LOW COATING LEVELS

(75) Inventors: Shulong Li, Spartanburg, SC (US); John A. Sollars, Jr., LaGrange, GA (US)

(73) Assignee: Milliken & Company, Spartanburg, SC (US)

(*) Notice: Subject to any disclaimer, the term of this patent is extended or adjusted under 35 U.S.C. 154(b) by 4 days.

This patent is subject to a terminal disclaimer.

(21) Appl. No.: 09/767,156

(22) Filed: Jan. 22, 2001

Related U.S. Application Data

(63) Continuation-in-part of application No. 09/501,467, filed on Feb. 9, 2000, which is a continuation-in-part of application No. 09/350,620, filed on Jul. 9, 1999, now Pat. No. 6,177,366, which is a continuation-in-part of application No. 09/335,257, filed on Jun. 17, 1999, now Pat. No. 6,177,365, application No. 09/767,156, which is a continuation-in-part of application No. 09/406,264, filed on Sep. 24, 1999, now Pat. No. 6,220,309.

(51) Int. Cl.$^7$ .................. B60R 21/22; B60R 21/16; B32B 27/04; B32B 5/26

(52) U.S. Cl. ............... 442/76; 442/65; 442/182; 442/239; 442/242; 442/248; 442/249; 442/250; 428/34.1; 428/34.3; 428/36.1; 280/728.1; 280/730.2

(58) Field of Search ............... 442/65, 76, 182, 442/239, 242, 248, 249, 250; 428/34.1, 34.3, 36.1; 280/728.1, 730.2

(56) References Cited

U.S. PATENT DOCUMENTS

| | | | | |
|---|---|---|---|---|
| 5,073,418 A | * | 12/1991 | Thornton et al. | 139/387 R |
| 5,236,775 A | * | 8/1993 | Swoboda et al. | 139/384 R |
| 5,554,424 A | * | 9/1996 | Krummheuer et al. | 280/728.1 |
| 5,637,114 A | * | 6/1997 | Hohnke | 139/389 |
| 5,650,207 A | * | 7/1997 | Crouch | 139/389 |
| 5,858,886 A | * | 1/1999 | Bowen et al. | 280/728.1 |
| 5,897,929 A | * | 4/1999 | Li et al. | 280/728.1 |
| 5,945,186 A | * | 8/1999 | Li et al. | 428/36.1 |
| 5,994,243 A | * | 11/1999 | Bowen et al. | 139/389 |
| 6,177,365 B1 | * | 1/2001 | Li | 280/728.1 |
| 6,177,366 B1 | * | 1/2001 | Li | 280/728.1 |
| 6,294,487 B1 | * | 9/2001 | Keshavaraj | 280/728.1 |
| 2001/0020780 A1 | * | 9/2001 | Kato et al. | 280/743.1 |

* cited by examiner

Primary Examiner—Terrel Morris
Assistant Examiner—Arti R. Singh
(74) Attorney, Agent, or Firm—Terry T. Moyer; William S. Parks

(57) ABSTRACT

Coated inflatable fabrics, more particularly airbags to which very low add-on amounts of coating have been applied, are provided which exhibit extremely low air permeabilities. The inventive fabrics are primarily for use in automotive restraint cushions which require low permeability characteristics (such as side curtain airbags). Traditionally, heavy, and thus expensive, coatings of compounds such as neoprene, silicones and the like, have been utilized to provide such required low permeability. The inventive fabric utilizes an inexpensive, very thin coating to provide such necessary low permeability levels. Thus, the inventive coated airbag possesses a coating of at most 3.0 ounces per square yard, most preferably about 0.8 ounces per square yard, and exhibits a leak-down time (a measurement of the time required for the entire amount of gas introduced within the airbag at peak pressure during inflation to escape the airbag at 10 psi) of at least 5 seconds as well as very low packing volumes (for more efficient use of storage space within a vehicle). All coatings, in particular elastomeric, preferably, though not necessarily, non-silicon coatings, and coated airbags meeting these criteria are intended to reside within the scope of this invention.

40 Claims, 3 Drawing Sheets

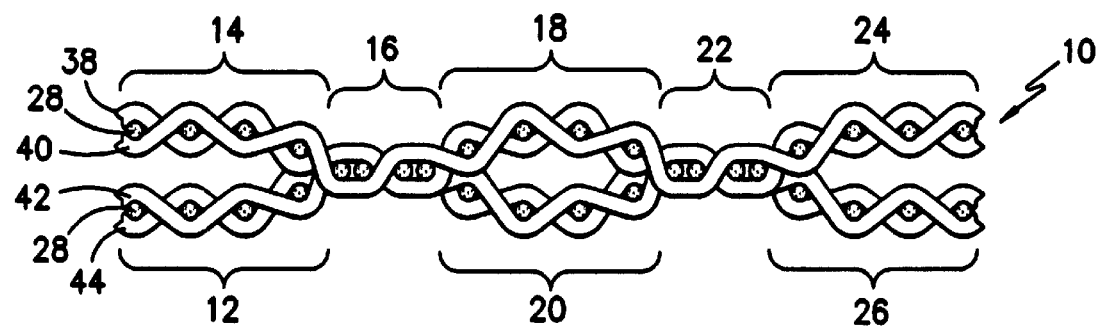
FIG. -1-
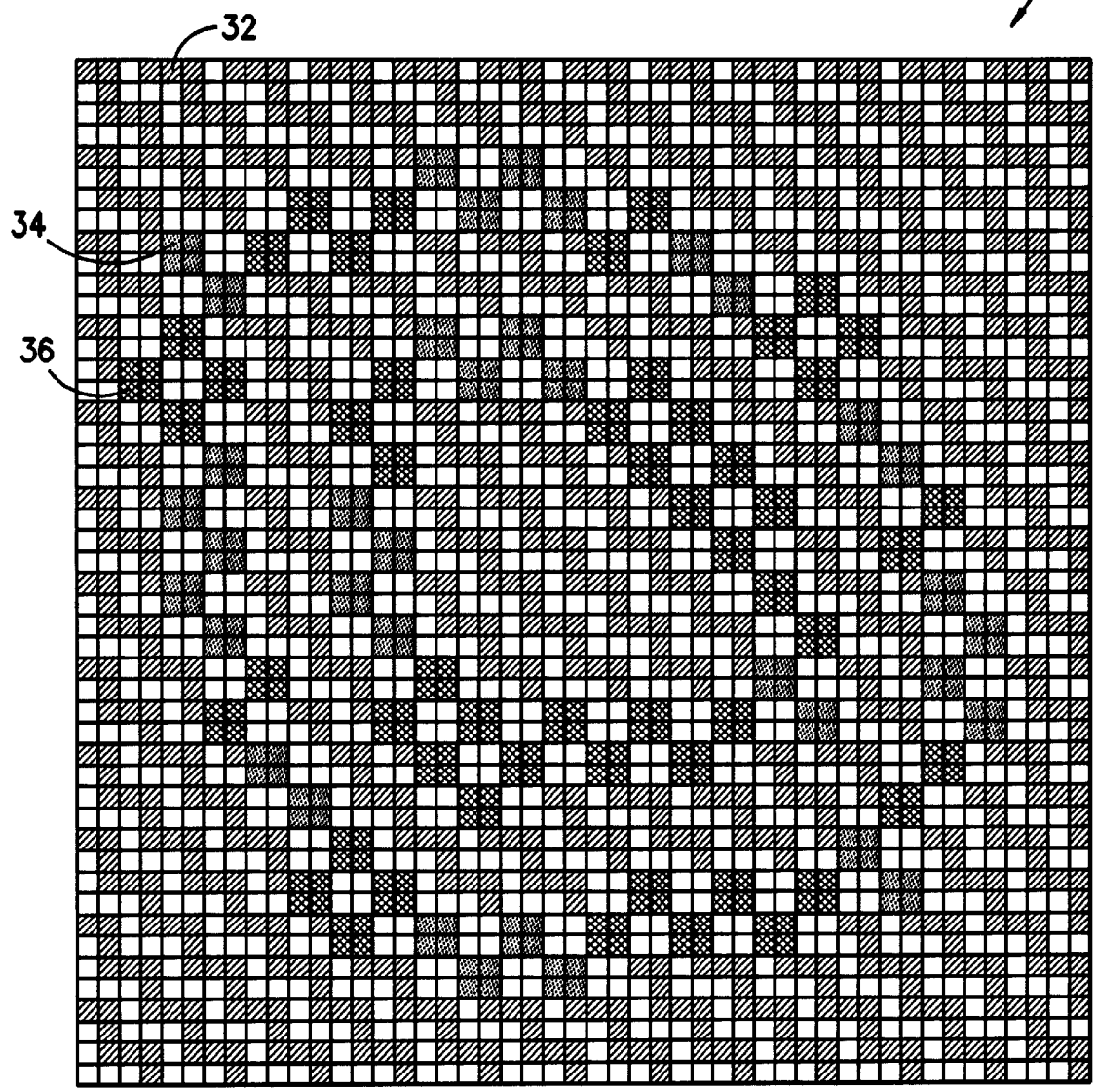
FIG. -2-

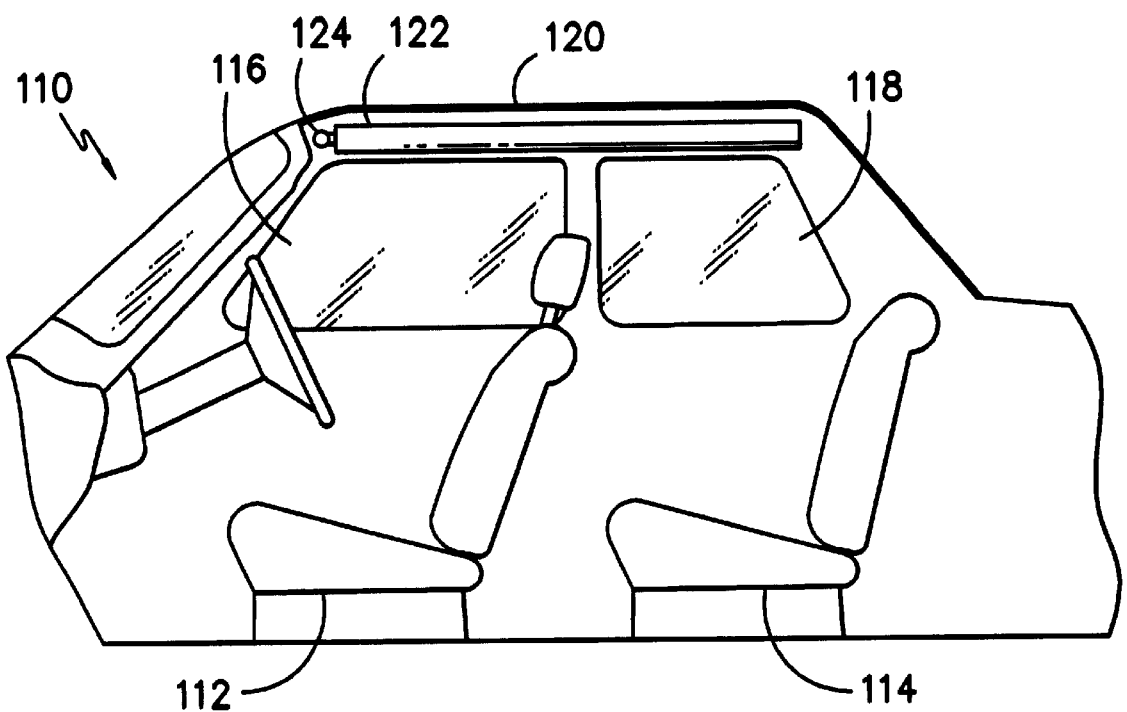
FIG. -3-
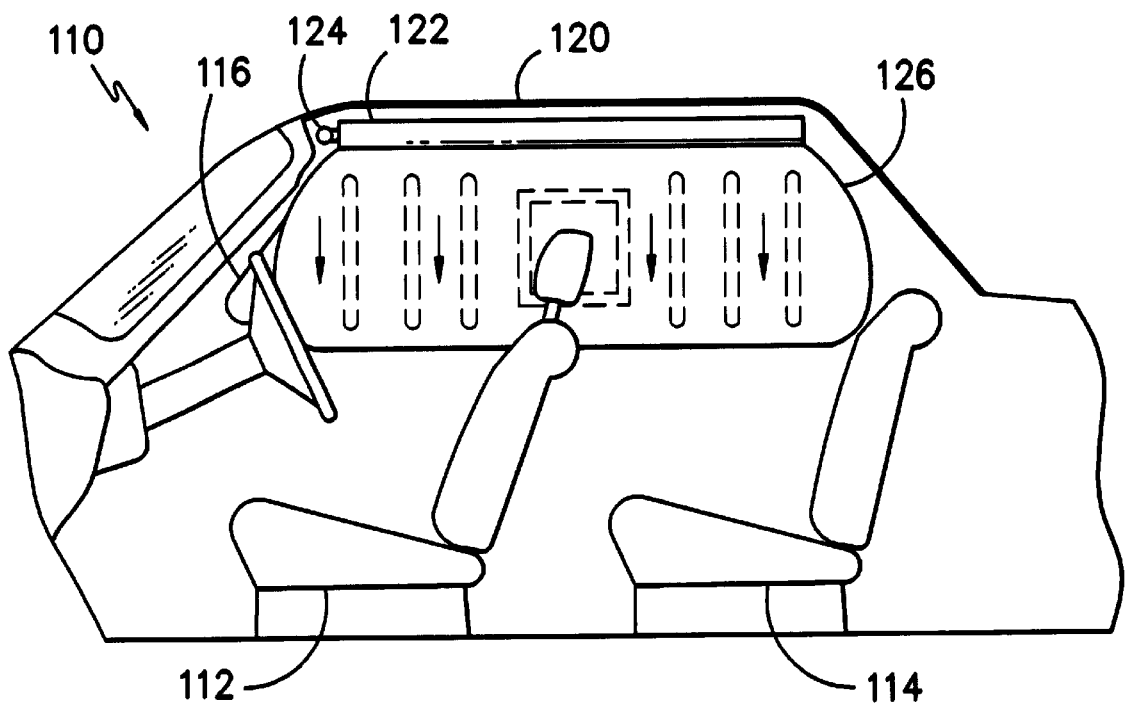
FIG. -4-

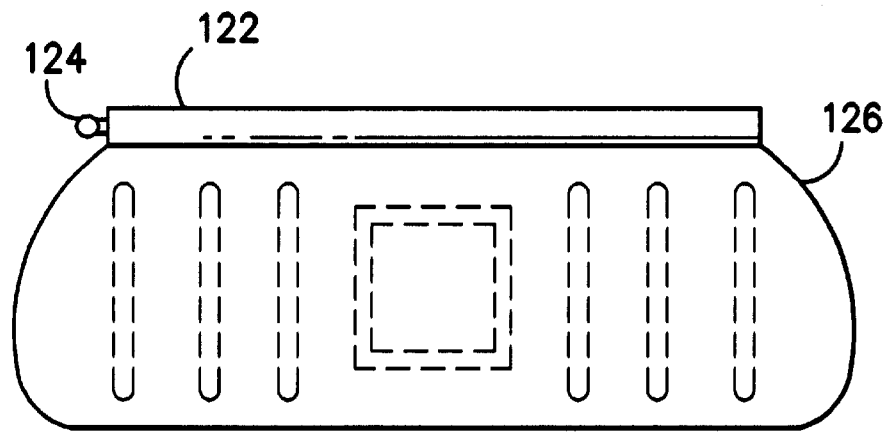
FIG. -5-
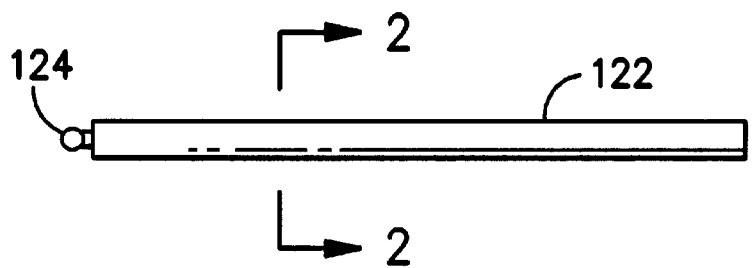
FIG. -6-
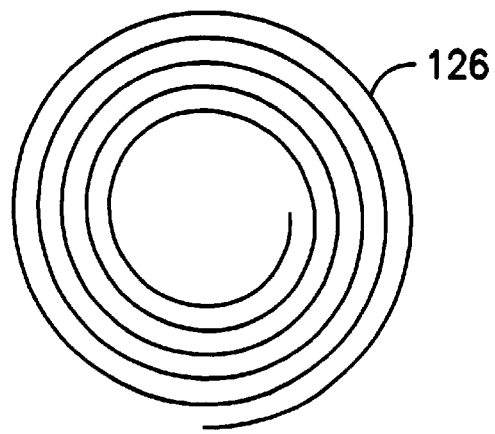
FIG. -7-

LOW PERMEABILITY SIDE CURTAIN AIRBAG CUSHIONS HAVING EXTREMELY LOW COATING LEVELS

CROSS REFERENCE TO RELATED APPLICATIONS

This application is a continuation in-part of co-pending application Ser. No. 09/501,467, filed Feb. 9, 2000, which is a continuation-in-part of Ser. No. 09/350,620, now U.S. Pat. No. 6,177,366, filed on Jul. 9, 1999, which is a continuation-in-part of Ser. No. 09/335,257, now U.S. Pat. No. 6,177,365, filed on Jun. 17, 1999; this application is also a continuation-in-part of co-pending application Ser. No. 09/406,264, now U.S. Pat. No. 6,220,309, filed on Sep. 24, 1999. These parent, grand-parent, and great-grandparent applications are herein entirely incorporated by reference.

FIELD OF THE INVENTION

All U.S. Patents cited herein are entirely incorporated by reference.

This invention relates generally to coated inflatable fabrics and more particularly concerns airbag cushions to which very low add-on amounts of coating have been applied and which exhibit extremely low air permeability. The inventive inflatable fabrics are primarily for use in automotive restraint cushions that require low permeability characteristics (such as side curtain airbags). Traditionally, heavy, and thus expensive, coatings of compounds such as neoprene, silicones and the like, have been utilized to provide such required low permeability. The inventive fabric utilizes an inexpensive, very thin coating to provide such necessarily low permeability levels. Thus, the inventive coated inflatable airbag possesses a coating comprising an elastomeric material (or materials) in contact with the target fabric wherein the elastomeric material possesses a tensile strength of at least 2,000 psi and an elongation at break of at least 180%. The coating is then applied to the airbag surface in an amount of at most 3.0 ounces per square yard (and preferably forms a film). The inventive airbag exhibits a characteristic leak-down time (defined as the ratio of inflated bag volume to bag volumetric leakage rate at 10 psi) of at least 5 seconds after inflation. The resultant airbag cushions, particularly low permeability cushions exhibiting very low rolled packing volumes, are intended to reside within the scope of this invention.

BACKGROUND OF THE PRIOR ART

Airbags for motor vehicles are known and have been used for a substantial period of time. A typical construction material for airbags has been a polyester or nylon fabric, coated with an elastomer such as neoprene, or silicone. The fabric used in such bags is typically a woven fabric formed from synthetic yarn by weaving practices that are well known in the art.

The coated material has found acceptance because it acts as an impermeable barrier to the inflation medium. This inflation medium is generally a nitrogen or helium gas generated from a gas generator or inflator. Such gas is conveyed into the cushion at a relatively warm temperature. The coating obstructs the permeation of the fabric by such gas, thereby permitting the cushion to rapidly inflate without undue decompression during a collision event.

Airbags may also be formed from uncoated fabric which has been woven in a manner that creates a product possessing low permeability or from fabric that has undergone treatment such as calendaring to reduce permeability. Fabrics which reduce air permeability by calendaring or other mechanical treatments after weaving are disclosed in U.S. Pat. No. 4,921,735; U.S Pat. No. 4,977,016; and U.S Pat. No. 5,073,418 (all incorporated herein by reference).

Silicone coatings typically utilize either solvent based or complex two component reaction systems. Dry coating weights for silicone have been in the range of about 3 to 4 ounces per square yard or greater for both the front and back panels of side curtain airbags. As will be appreciated by one of ordinary skill in this art, high add on weights substantially increase the cost of the base fabric for the airbag and make packing within small airbag modules very difficult. Furthermore, silicone exhibits very low tensile strength characteristics that do not withstand high pressure inflation easily without the utilization of very thick coatings.

The use of a particular type of polyurethane as a coating as disclosed in U.S. Pat. No. 5,110,666 to Menzel et al. (herein incorporated by reference) permits low add on weights reported to be in the range of 0.1 to 1 ounces per square yard but the material itself is relatively expensive and is believed to require relatively complex compounding and application procedures due to the nature of the coating materials. Patentees, however, fails to disclose any pertinent elasticity and/or tensile strength characteristics of their particular polyurethane coating materials. Furthermore, there is no discussion pertaining to the importance of the coating ability (and thus correlated low air permeability) at low add-on weights of such polyurethane materials on side curtain airbags either only for fabrics which are utilized within driver or passenger side cushions. All airbags must be inflatable extremely quickly; upon sensing a collision, in fact, airbags usually reach peak pressures within 10 to 20 milliseconds. Regular driver side and passenger side air bags are designed to withstand this enormous inflation pressure; however, they also deflate very quickly in order to effectively absorb the energy from the vehicle occupant hitting the bag. Such driver and passenger side cushions (airbags) are thus made from low permeability fabric, but they also deflate quickly at connecting seams (which are not coated to prevent air leakage) or through vent holes. Furthermore, the low add-on coatings taught within Menzel, and within U.S. Pat. No. 5,945,186 to Li et al., would not provide long-term gas retention; they would actually not withstand the prolonged and continuous pressures supplied by activated inflators for more than about 2 seconds, at the most. The low permeability of these airbag fabrics thus aid in providing a small degree of sustained gas retention within driver and passenger airbag cushions to provide the deflating cushioning effects necessary for sufficient collision protection. Such airbag fabrics would not function well with side curtain airbags, since, at the very least, the connecting seams which create the pillowed, cushioned structures within such airbags, as discussed in greater detail below, would exhibit too high a leakage rate upon inflation at requisite high gas pressures. As these areas provide the greatest degree of leakage during and after inflation, the aforementioned patented low coating low permeability airbag fabrics would not be properly utilized within side curtain airbags, in particular side curtain airbags intended to provide extended rollover protection.

As alluded to above, there are three primary types of different airbags, each for different end uses. For example, driver-side airbags are generally mounted within steering columns and exhibit relatively high air permeabilities in order to act more as a cushion for the driver upon impact. Passenger-side airbags also comprise relatively high air permeability fabrics which permit release of gas either therethrough or through vents integrated therein. Both of these types of airbags are designed to protect persons in sudden collisions and generally burst out of packing modules from either a steering column or dashboard (and thus have multiple "sides"). Side curtain airbags, however, have been designed primarily to protect passengers during side crashes provide rollover protection by retaining their inflation state for a long duration, and generally unroll from packing containers stored within the roofline along the side windows of an automobile (and thus have a back and front side only). Side curtain airbags therefore not only provide cushioning effects but also provide protection from broken glass and other debris. As such, it is imperative that side curtain airbags, as noted above, retain large amounts of gas, as well as high gas pressures, to remain inflated throughout the longer time periods of the entire potential rollover situation. To accomplish this, these side curtains are generally coated with very large amounts of sealing materials on both the front and back sides. Since most side curtain airbag fabrics comprise woven blanks that are either sewn, sealed, or integrally woven together, discrete areas of potentially high leakage of gas are prevalent, particularly at and around the seams. It has been accepted as a requirement that heavy coatings were necessary to provide the low permeability (and thus high leak-down time) necessary for side curtain airbags. Without such heavy coatings, such airbags would most likely deflate too quickly and thus would not function properly during a rollover collision. As will be well understood by one of ordinary skill in this art, such heavy coatings add great cost to the overall manufacture of the target side curtain airbags. There is thus a great need to manufacture low permeability side curtain airbags with less expensive (preferably lower coating add-on weight) coatings without losing the aging, stability, and permeability characteristics necessary for proper functioning upon deployment. To date, there has been little accomplished, if anything at all, alleviating the need for such thick and heavy airbag coatings from side curtain airbags.

Furthermore, there is a current drive to store such low permeability side curtain airbags within very thin, preferably, though not necessarily, cylindrically shaped modules. Since these airbags are generally stored within the rooflines of automobiles, and the area available is quite limited, there is always a great need to restrict the packing volume of such restraint cushions to their absolute minimum. However, the previously practiced low permeability side curtain airbags have proven to be very cumbersome to store in such cylindrically shaped containers at the target automobile's roofline. The actual time and energy required to roll such heavily coated low permeability articles as well as the packing volume itself, has been very difficult to reduce. Furthermore, with such heavy coatings utilized, the problems of blocking (i.e., adhering together of the different coated portions of the cushion) are amplified when such articles are so closely packed together. The chances of delayed unrolling during inflation are raised when the potential for blocking is present. Thus, a very closely packed, low packing volume, low blocking side curtain low permeability airbag is highly desirable. Unfortunately, the prior art has again not accorded such an advancement to the airbag industry.

OBJECTS AND BRIEF DESCRIPTION OF THE INVENTION

In light of the background above, it can be readily seen that there exists a need for a low permeability, side curtain airbag that utilizes lower, and thus less expensive, amounts of coating, and therefore exhibits a substantially reduced packing volume over the standard low permeability type side curtain airbags. Such a coated low permeability airbag must provide a necessarily long leak-down time upon inflation and after long-term storage. Such a novel airbag and a novel coating formulation provides marked improvements over the more expensive, much higher add-on airbag coatings (and resultant airbag articles) utilized in the past.

It is therefore an object of this invention to provide a coated airbag, wherein the coating is present in a very low add-on weight, possessing extremely high leak-down time characteristics after inflation and thus complementary low permeability characteristics. Another object of the invention is to provide an inexpensive side curtain airbag cushion. A further object of this invention is to provide an highly effective airbag coating formulation which may be applied in very low add-on amounts to obtain extremely low permeability airbag structures after inflation. An additional object of this invention is to provide an airbag coating formulation which not only provides beneficial and long-term low permeability, but also exhibits excellent long-term storage stability (through heat aging and humidity aging testing). Yet another object of the invention is to provide a low permeability side curtain airbag possessing a very low rolled packing volume and non-blocking characteristics for effective long-term storage within the roofline of an automobile.

Accordingly, this invention is directed to an airbag cushion comprising a coated fabric, wherein said fabric is coated with an elastomeric composition in an amount of at most 3.0 ounces per square yard of the fabric; and wherein said airbag cushion, after long-term storage, exhibits a characteristic leak-down time of at least 5 seconds. Also, this invention concerns an airbag cushion comprising a coated fabric, wherein said fabric is coated with an elastomeric composition; wherein said elastomeric composition comprises at least one elastomer possessing a tensile strength of at least 2,000 psi and an elongation of at least 180%; and wherein said airbag cushion, after long-term storage, exhibits a characteristics leak-down time of at least 5 seconds. Additionally, this invention encompasses a coated airbag cushion which exhibits a packing volume factor (measured as the rolled diameter of the airbag cushion divided by the measured depth of coverage measured from the attachment point of the target automobile's roofline to lowest point of coverage below the roofline after inflation) of at most 0.05.

The term "characteristic leak-down time" is intended to encompass the measurement of time required for the entire amount of inflation gas introduced within an already-inflated (to a peak initial pressure which "opens" up the areas of weak sealing) and deflated airbag cushion upon subsequent re-inflation at a constant pressure at 10 psi. It is well known and well understood within the airbag art, and particularly concerning side curtain (low permeability) airbag cushions, that retention of inflation gas for long periods of time is of utmost importance during a collision that results in rollover and other subsequent problems. Side curtain airbags are designed to inflate as quickly as driver- and passenger-side bags, but they must deflate very slowly to protect the occupants during roll over and side impact. Thus, it is imperative that the bag exhibit a very low leakage rate after the bag experiences peak pressure during the instantaneous, quick inflation. Hence, the coating on the bag must be strong enough to withstand the shock and stresses when the bag is inflated so quickly. Thus, a high characteristic leak-down time measurement is paramount in order to retain the maximum amount of beneficial cushioning gas within the inflated airbag. Airbag leakage after inflation (and after peak pressure is reached) is therefore closely related to actual pressure retention characteristics. The pressure retention characteristics (hereinafter referred to as "leak-down time") of already-inflated and deflated side curtain airbags can be described by a characteristic leak-down time t, wherein:

$$t(\text{second}) = \frac{\text{Bag volume}(\text{ft}^3)}{\text{Volumetric leakage rate }(SCFH*) \text{ at 10 Psi}} \times 3600$$

*SCFH: standard cubic feet per hour.

It is understood that the 10 psi constant is not a limitation to the invention; but merely the constant pressure at which the leak-down time measurements are made. Thus, even if the pressure is above or below this amount during actual inflation or after initial pressurizing of the airbag, the only limitation is that if one of ordinary skill in the art were to measure the bag volume and divide that by the volumetric leakage rate (at 10 psi), the resultant measurement in time would be at least 5 seconds. Preferably, this time is greater than about 9 seconds; more preferably, greater than about 15 seconds; and most preferably, greater than about 20 seconds.

Likewise, the term, "after long-term storage" encompasses either the actual storage of an inventive airbag cushion within an inflator assembly (module) within an automobile, and/or in a storage facility awaiting installation. Furthermore, this term also encompasses any storage which is intended to simulate such long-term storage (through oven-aging, as one example) as well. Such a measurement is generally accepted, and is well understood and appreciated by the ordinarily skilled artisan, to be made through comparable analysis after representative heat and humidity aging tests. These tests generally involve 107° C. oven aging for 400 hours, followed by 83° C. and 95% relative humidity aging for a subsequent 400 hours and are universally accepted as proper estimations of the conditions of long-term storage for airbag cushions. Thus, this term encompasses such measurement tests. The inventive airbag fabrics must exhibit proper characteristic leak-down times after undergoing such rigorous pseudo-storage testing.

The inventive elastomeric coating composition must comprise at least one elastomer that possesses a tensile strength of at least 2,000 psi and an elongation to break of greater than about 180%. Preferably, the tensile strength is at least 3,000 psi, more preferably, 4,000, and most preferably at least about 6,000 (the high end is basically the highest one can produce which can still adhere to a fabric surface). The preferred elongation to break is more than about 200%, more preferably more than about 300%, and most preferably more than about 600%. These characteristics of the elastomer translate to a coating that is both very strong (and thus will withstand enormous pressures both at inflation and during the time after inflation and will not easily break) and can stretch to compensate for such large inflation, etc., pressures. Thus, when applied at the seams of a side curtain airbag, as well as over the rest of the airbag structure, the coating will most preferably (though not necessarily) form a continuous film. This coating acts to both fill the individual holes between the woven yarns and/or stitches, etc., as well as to "cement" the individual yarns in place. During inflation, then, the coating prevents leakage through the interstitial spaces between the yarns and aids in preventing yarn shifting (which may create larger spaces for possible gas escape).

The utilization of such high tensile strength and high elongation at break components permits the consequent utilization, surprisingly, of extremely low add-on weight amounts of such coating formulations. Normally, the required coatings on side curtain airbags are very high, at least 3.0 ounces per square yard (with the standard actually much higher than that, at about 4.0). The inventive airbag cushions require at most 3.0 (preferably less, such as 2.0, more preferably 1.8, still more preferably, about 1.5, and most preferably, as low as 0.8) ounces per square yard of this inventive coating to effectuate the desired high leak-down (low permeability). Furthermore, the past coatings were required to exhibit excellent heat and humidity aging stability. Unexpectedly, even at such low add-on amounts, and particularly with historically questionable coating materials (polyurethanes, for example), the inventive coatings, and consequently, the inventive coated airbag cushions, exhibit excellent heat aging and humidity aging characteristics. Thus, the coating compositions and coated airbags are clearly improvements within this specific airbag art.

Of particular interest as the elastomer components within the inventive elastomeric compositions are, specifically, polyamides, polyurethanes, acrylic elastomers, hydrogenated nitrile rubbers (i.e., hydrogenated NBR), fluoroelastomers (i.e., fluoropolymers and copolymers containing fluoro-monomers), ethylene-vinylacetate copolymers, and ethylene acrylate copolymers. Also, such elastomers may or may not be cross-linked on the airbag surface. Preferably, the elastomer is a polyurethane and most preferably is a polycarbonate polyurethane elastomer. Such a compound is available from Bayer Corporaiton under the tradename Impranil®, including Impranil® 85 UD, ELH, and EHC-01. Other acceptable polyurethanes include Bayhydrol® 123, also from Bayer; Ru 41-710, EX 51-550, and Ru 400-350, both from Stahl USA. Any polyurethane, or elastomer, for that matter, which exhibits the same tensile strength and elongation at break characteristics as noted above, however, are potentially available within the inventive coating formulation and thus on the inventive coated airbag cushion. In order to provide the desired leak-down times at long-term storage, however, the add-on weights of other available elastomers may be greater than others. However, the upper limit of 3.0 ounces per square yard should not be exceeded to meet this invention. The desired elastomers may be added in multiple layers if desired as long the required thickness for the overall coating is not exceeded. Alternatively, the multiple layer coating system may also be utilized as long as at least one elastomer possessing the desired tensile strength and elongation at break is utilized. In particular, such a coating system may include, as one example, a polyurethane-based bottom layer (for good tensile strength for low air permeability)(with an optional adhesion promoter present between the layer and the fabric) and a second layer of silicone (to provide excellent aging resistance, for example). Other types of such multiple coating systems are disclosed within grand-parent application Ser. No. 09/350, 620, above fully incorporated by reference.

Other possible components present within the elastomer coating composition are thickeners, antioxidants, flame retardants, coalescent agents, adhesion promoters, and colorants. In accordance with the potentially preferred practices of the present invention, a dispersion (either solvent- or water-borne, depending on the selected elastomer) of finely divided elastomeric resin is compounded, or present in a resin solution, with a thickener and a flame retardant to yield a compounded mix having a viscosity of about 8000 centipoise or greater. A polyurethane is potentially preferred, with a polycarbonate polyurethane, such as those noted above from Bayer and Stahl, most preferred. Other potential elastomeric resins include other polyurethanes, such as Witcobond™ 253 (35% solids), from Witco, and Sancure, from BFGoodrich, Cleveland, Ohio; hydrogenated NBR, such as Chemisat™ LCH-7335X (40% solids), from Goodyear Chemical, Akron, Ohio; EPDM, such as EP-603A rubber latex, from Lord Corporation, Erie, Pa.; butyl rubber, such as Butyl rubber latex BL-100, from Lord Corporation; and acrylic rubber (elastomers), such as HyCar™, from BFGoodrich. This list should not be understood as being all-inclusive, only exemplary of potential elastomers. Furthermore, the preferred elastomer will not include any silicone, due to the extremely low tensile strength (typically below about 1,500 psi) characteristics exhibited by such materials. However, in order to provide effective aging and non-blocking benefits, such components may be applied to the elastomeric composition as a topcoat as long as the add-on weight of the entire elastomer and topcoat does not exceed 3.0 ounces per square yard and the amount of silicone within the entire elastomer composition does not exceed 20% by weight. Additionally, certain elastomers comprising polyester or polyether segments or other similar components, may not be undesirable, particularly at very low add-on weights (i.e., 0.8–1.2 oz/yd$^2$) due to stability problems in heat and humidity aging (polyesters easily hydrolyze in humidity and polyethers easily oxidize in heat); however, such elastomers may be utilized in higher add-on amounts as long, again, as the 3.0 ounces per square yard is not exceeded.

Among the other additives particularly preferred within this elastomer composition are heat stabilizers, flame retardants, primer adhesives, and materials for protective topcoats. A potentially preferred thickener is marketed under the trade designation NATROSOL™ 250 HHXR by the Aqualon division of Hercules Corporation which is believed to have a place of business at Wilmington, Del. In order to meet Federal Motor Vehicle Safety Standard 302 flame retardant requirements for the automotive industry, a flame retardant is also preferably added to the compounded mix. One potentially preferred flame retardant is AMSPERSE F/R 51 marketed by Amspec Chemical Corporation which is believed to have a place of business at Gloucester City N.J. Primer adhesives may be utilized to facilitate adhesion between the surface of the target fabric and the elastomer itself. Thus, although it is preferable for the elastomer to be the sole component of the entire elastomer composition in contact with the fabric surface, it is possible to utilize adhesion promoters, such as isocyanates, epoxies, functional silanes, and other such resins with adhesive properties, without deleteriously effecting the ability of the elastomer to provide the desired low permeability for the target airbag cushion. A topcoat component, as with potential silicones, as noted above, may also be utilized to effectuate proper non-blocking characteristics to the target airbag cushion. Such a topcoat may perform various functions, including, but not limited to, improving aging of the elastomer (such as with silicone) or providing blocking resistance due to the adhesive nature of the coating materials (most noticeably with the preferred polyurethane polycarbonates).

Airbag fabrics must pass certain tests in order to be utilized within restraint systems. One such test is called a blocking test which indicates the force required to separate two portions of coated fabric from one another after prolonged storage in contact with each other (such as an airbag is stored). Laboratory analysis for blocking entails pressing together coated sides of two 2 inch by 2 inch swatches of airbag fabric at 5 psi at 100° C. for 7 days. If the force required to pull the two swatches apart after this time is greater than 50 grams, or the time required to separate the fabrics utilizing a 50 gram weight suspended from the bottom fabric layer is greater than 10 seconds, the coating fails the blocking test. Clearly, the lower the required separating shear force, the more favorable the coating. For improved blocking resistance (and thus the reduced chance of improper adhesion between the packed fabric portions), topcoat components may be utilized, such as talc, silica, silicate clays, and starch powders, as long as the add-on weight of the entire elastomer composition (including the topcoat) does not exceed 3.0 ounces per square yard (and preferably exists at a much lower level, about 1.5, for instance).

Two other tests which the specific coated airbag cushion must pass are the oven (heat) aging and humidity aging tests. Such tests also simulate the storage of an airbag fabric over a long period of time upon exposure at high temperatures and at relatively high humidities. These tests are actually used to analyze alterations of various different fabric properties after such a prolonged storage in a hot ventilated oven (>100° C.) (with or without humid conditions) for 2 or more weeks. For the purposes of this invention, this test was used basically to analyze the air permeability of the coated side curtain airbag by measuring the characteristic leak-down time (as discussed above, in detail). The initially produced and stored inventive airbag cushion should exhibit a characteristic leak-down time of greater than about 5 seconds (upon re-inflation at 10 psi gas pressure after the bag had previously been inflated to a peak pressure above about 15 psi and allowed to fully deflate) under such harsh storage conditions. Since polyurethanes, the preferred elastomers in this invention, may be deleteriously affected by high heat and humidity (though not as deleteriously as certain polyester and polyether-containing elastomers), it may be prudent to add certain components within a topcoat layer and/or within the elastomer itself. Antioxidants, antidegradants, and metal deactivators may be utilized for this purpose. Examples include, and are not intended to be limited to, Irganox® 1010 and Irganox® 565, both available from CIBA Specialty Chemicals. This topcoat may also provide additional protection against aging and thus may include topcoat aging improvement materials, such as, and not limited to, polyamides, NBR rubbers, EPDM rubbers, and the like, as long as the elastomer composition (including the topcoat) does not exceed the 3.0 ounces per square yard (preferably much less than that, about 1.5 at the most) of the add-on weight to the target fabric.

Other additives may be present within the elastomer composition, including, and not limited to, colorants, UV stabilizers, fillers, pigments, and crosslinking/curing agents, as are well known within this art.

The substrate to which the inventive elastomeric coatings are applied to form the airbag base fabric in accordance with the present invention is preferably a woven fabric formed from yarns comprising synthetic fibers, such as polyamides or polyesters. Such yarn preferably has a linear density of about 105 denier to about 840 denier, more preferably from about 210 to about 630 denier. Such yarns are preferably formed from multiple filaments wherein the filaments have linear densities of about 6 denier per filaments or less and most preferably about 4 denier per filament or less. In the more preferred embodiment such substrate fabric will be formed from fibers of nylon, and most preferred is nylon 6,6. It has been found that such polyamide materials exhibit particularly good adhesion and maintenance of resistance to hydrolysis when used in combination with the coating according to the present invention. Such substrate fabrics are preferably woven using fluid jet weaving machines as disclosed in U.S. Pat. Nos. 5,503,197 and 5,421,378 to Bower et al. (incorporated herein by reference). Such woven fabric will be hereinafter referred to as an airbag base fabric. As noted above, the inventive airbag must exhibit extremely low permeability and thus must be what is termed a "side curtain" airbag. As noted previously and extensively, such side curtain airbags (a.k.a., cushions) must retain a large amount of inflation gas during a collision in order to accord proper long-duration cushioning protection to passengers during rollover accidents. Any standard side curtain airbag may be utilized in combination with the low add-on coating to provide a product which exhibits the desired leak-down times as noted above. Most side curtain airbags are produced through labor-intensive sewing or stitching (or other manner) together two separate woven fabric blanks to form an inflatable structure. Furthermore, as is well understood by the ordinarily skilled artisan, such sewing, etc., is performed in strategic locations to form seams (connection points between fabric layers) which in turn produce discrete open areas into which inflation gasses may flow during inflation. Such open areas thus produce pillowed structures within the final inflated airbag cushion to provide more surface area during a collision, as well as provide strength to the bag itself in order to withstand the very high initial inflation pressures (and thus not explode during such an inflation event). Other side curtain airbag cushions exist which are of the one-piece woven variety. Basically, some inflatable airbags are produced through the simultaneous weaving of two separate layers of fabric which are joined together at certain strategic locations (again, to form the desired pillowed structures). Such cushions thus present seams of connection between the two layers. It is the presence of so many seams (in both multiple-piece and one-piece woven bags) which create the aforementioned problems of gas loss during and after inflation. The possibility of yarn shifting, particularly where the yarns shift in and at many different ways and amounts, thus creates the quick deflation of the bag through quick escaping of inflation gasses. Thus, the base airbag fabrics do not provide much help in reducing permeability (and correlated leak-down times, particularly at relatively high pressures). It is this seam problem which has primarily created the need for the utilization of very thick, and thus expensive, coatings to provide necessarily low permeability in the past.

Recently, a move has been made away from both the multiple-piece side curtain airbags (which require great amounts of labor-intensive sewing to attached woven fabric blanks) and the traditionally produced one-piece woven cushions, to more specific one-piece woven fabrics which exhibit substantially reduced floats between woven yarns to substantially reduce the unbalanced shifting of yarns upon inflation, such as in Ser. Nos. 09/406,264 and 09/668,857, both to Sollars, Jr., the specifications of which are completely incorporated herein and described in greater depth hereafter:

The term "inflatable fabric" hereinafter is intended to encompass any fabric which is constructed of at least two layers of fabric which can be attached and/or sealed to form a bag article. The inventive inflatable fabric thus must include double layers of fabric to permit such inflation, as well as single layers of fabric either to act as a seal at the ends of such fabric panels, or to provide "pillowed" chambers within the target fabric upon inflation. The term "all-woven" as it pertains to the inventive fabric thus requires that the inflatable fabric having double and single layers of fabric be produced solely upon a loom. Any type of loom may be utilized for this purpose, such as water-jet, air-jet, rapier, and the like. Patterning may be performed utilizing Jacquard weaving and/or dobby weaving, particularly on fluid-jet and/or high speed rapier loom types.

The constructed fabric may exhibit balanced or unbalanced pick/end counts; the main requirement in the woven construction is that the single layer areas of the inflatable fabric exhibit solely basket-weave patterns. These patterns are made through the arrangement of at least one warp yarn (or weft yarn) configured around the same side of two adjacent weft yarns (or warp yarns) within the weave pattern. The resultant pattern appears as a "basket" upon the arrangement of the same warp (or weft) yarn to the opposite side of the next adjacent weft (or warp) yarn. Such basket weave patterns may include the arrangement of a warp (or weft) yarn around the same side of any even number of weft (or warp) yarns, preferably up to about six at any one time, most preferably up to about 4.

The sole utilization of such basket weave patterns in the single layer zones provides a number of heretofore unexplored benefits within inflatable fabric structures. For example, such basket weave patterns permit a constant "seam" width and weave construction over an entire single layer area, even where the area is curved. As noted above, the standard Oxford weaves currently utilized cannot remain as the same weave pattern around curved seams; they become plain weave patterns. Also, such basket weave seam patterns permit the construction of an inflatable fabric having only plain woven double layer fabric areas and single layer "seams" with no "floats" of greater than three picks within the entire fabric structure. Such a fabric would thus not possess discrete locations where the air permeability is substantially greater than the remaining portions of the fabric. Additionally, such a weave structure permits the utilization of as low as two different weave densities (patterns, etc.) in the area of the produced seam. Thus, the seam itself is of one weave pattern and the weave pattern in the area directly adjacent to the seam is another weave pattern. No other patterns are utilized in that specific seam area. By directly adjacent, it is intended that such a described area is within at most 14 yarn-widths, preferably as low as 2 yarn-widths, and most preferably between about 4 and 8 yarn-widths, from the actual seam itself. Such a limitation on different weave densities has never been accomplished in all-woven airbags in the past.

Generally, the prior art (such as Thornton et al., supra) provides seam attachments exhibited at least three different weave densities within the directly adjacent area of the seams themselves. Furthermore, the prior art weaving procedures produce floats of sometimes as much as six or seven picks at a time. Although available software to the weaving industry permits "filling in" of such floats within weave diagrams, such a procedure takes time and still does not continuously provide a fabric exhibiting substantially balanced air permeability characteristics over the entire structure. The basket-weave formations within the single fabric layers thus must be positioned in the fabric so as to prevent irregularities (large numbers of floats, for example) in the weave construction at the interface between the single and double fabric layers (as described in FIG. 2, below). Another benefit such basket weave patterns accord the user is the ability to produce more than one area of single layer fabric (i.e., another "seam" within the fabric) adjacent to the first "seam." Such a second seam provides a manner of dissipating the pressure from or transferring the load upon each individual yarn within both seams. Such a benefit thus reduces the chances of deleterious yarn shifting during an inflation event through the utilization of strictly a woven fabric construction (i.e., not necessarily relying upon the utilization of a coating as well). The previously disclosed or utilized inflatable fabrics having both double and single fabric layer areas have not explored such a possibility in utilizing two basket-weave pattern seams. Furthermore, such a two-seam construction eliminates the need for weaving a large single fabric layer area within the target inflatable fabric. The prior art fabrics which produce "pillowed" chambers for airbag cushions (such as side curtains), have been formed through the weaving of entire areas of single fabric layers (which are not actually seams themselves). Such a procedure is time-consuming and rather difficult to perform. The inventive inflatable fabric merely requires, within this alternative embodiment, at least two very narrow single fabric layer areas (seams) woven into the fabric structure (another preferred embodiment utilizes merely one seam of single layer fabric); the remainder of the fabric located within these two areas may be double layer if desired. Thus, the inventive fabric permits an improved, cost-effective, method of making a "pillowed" inflatable fabric.

The inflatable fabric itself, as noted above, is preferably produced from all-synthetic fibers, such as polyesters and polyamides, although natural fibers may also be utilized in certain circumstances. Preferably, the fabric is constructed of nylon-6,6, however, polyesters are also highly preferred. Mixtures of such fibers are also possible. The individual yarns utilized within the fabric substrate must generally possess deniers within the range of from about 40 to about 840; preferably from about 100 to about 630. Most preferably, such deniers average over the entire airbag fabric structure at most 525; more preferably average at most 420; and also preferably average 315 and even as low as 210, if desired. In such instances of such low average deniers (420 and below), the thickness of the fabric structure itself is quite low and thus, with the inventive coating applied at low add-on levels, exhibits excellent low packing volumes.

As noted above, coatings should be applied to the surface as a necessary supplement to reduce the air permeability of the inventive fabric. Since one preferred ultimate use of this inventive fabric is as a side curtain airbag which must maintain a very low degree of air permeability throughout a collision event (such as a rollover where the curtain must protect passengers for an appreciable amount of time), a decrease in permitted air permeability is highly desirable. With such a specific weaving pattern within the inventive inflatable fabric, lower amounts of coatings are permissible (as compared to other standard additions of such materials) to provide desired low inflation gas permeability. Any standard coating or laminate film, such as a silicone, polyurethane, polyamide, polyester, rubber (such as neoprene, for example), and the like, as discussed above, may be utilized for this purpose and may be applied in any standard method and in any standard amount on the fabric surface. However, the necessary amount of such a coating (or layers of coatings or laminate film or layer of laminate films) required to provide the desired low permeability is extremely low and is discussed in greater depth above. Again, the particular weave structures of the inventive inflatable fabric permits the utilization of such low coating amounts to provide the desired low permeability characteristics.

Additional objects and advantages of the invention will be set forth in part in the description which follows, and in part will be obvious from the description, or may be learned by practice for the invention. It is to be understood that both the foregoing general description and the following detailed description of preferred embodiments are exemplary and explanatory only, and are not to be viewed as in any way restricting the scope of the invention as set forth in the claims.

With such an improvement in one-piece side curtain airbags (and inflatable fabrics), the possibility of high leakage at seams is substantially reduced. These airbags provide balanced weave constructions at and around attachment points between two layers of fabrics such that the ability of the yarns to become displaced upon inflation at high pressures is reduced as compared with the standard one-piece woven airbags. Unfortunately, such inventive one-piece woven bags are still problematic in that the weave intersections may be displaced upon high pressure inflation such that leakage will still most likely occur at too high a rate for proper functioning. As a result, there is still a need to coat such one-piece woven structures with materials which reduce and/or eliminate such an effect. However, such one-piece woven structures permit extremely low add-on amounts of elastomeric coatings for low permeability effects. In fact, these inventive airbags function extremely well with low add-on coatings below 1.5 and as low as about 0.8 ounces per square yard.

Furthermore, although it is not preferred in this invention, it has been found that the inventive coating composition provides similar low permeability benefits to standard one-piece woven airbags, particularly with the inventive low add-on amounts of high tensile strength, high elongation, non-silicone coatings; however, the amount of coating required to permit high leak-down times is much higher than for the aforementioned Sollars, Jr. inventive one-piece woven structure. Thus, add-on amounts of as much as 1.5 and even up to about 2.2 ounces per square yard may be necessary to effectuate the proper low level of air permeability for these other one-piece woven airbags. Even with such higher add-on coatings, the inventive coatings themselves clearly provide a marked improvement over the standard, commercial, prior art silicone, etc., coatings (which must be present in amounts of at least 3.0 ounces per square yard).

Additionally, it has also been found that the inventive coating compositions, at the inventive add-on amounts, etc., provide the same types of benefits with the aforementioned sewn, stitched, etc., side curtain airbags. Although such structures are highly undesirable due to the high potential for leakage at these attachment seams, it has been found that the inventive coating provides a substantial reduction in permeability (to acceptable leak-down time levels, in fact) with correlative lower add-on amounts than with standard siliconeand neoprene rubber coating formulations. Such add-on amounts will approach the 3.0 ounces per square yard, but lower amounts have proven effective (1.5 ounces per square yard, for example) depending on the utilization of a sufficiently high tensile strength and sufficiently stretchable elastomeric component within the coating composition directly in contact with the target fabric surface. Again, with the ability to reduce the amount of coating materials (which are generally always quite expensive), while simultaneously providing a substantial reduction in permeability to the target airbag structure, as well as high resistance to humidity and extremely effective aging stability, the inventive coating composition, and the inventive coated airbag itself is clearly a vast improvement over the prior airbag coating art.

Of particular importance within this invention, is the ability to pack the coated airbag cushions within storage containers at the roof line of a target automobile in as small a volume as possible, such as within cylindrically or polygonally shaped modules. In a rolled, accordion-style, Z-folded (or any other) configuration (in order to best fit within the storage module itself, and thus in order to best inflate upon a collision event downward to accord the passengers sufficient protection), the inventive airbag may be constricted to a stored shape of as low volume as possible. It has been found that the best, though not the only, test of determining the effective low volume exhibited by a non-inflated side curtain airbag is to roll any bag lengthwise until it is substantially cylindrical in shape. In such a shape, it is preferable that the target side curtain airbag have a diameter of at most 23 millimeters. The term "diameter" is intended to encompass any cross-section of the inflatable fabric in its rolled storage configuration such that the length of the stored fabric is the same as the length of the inflated fabric, and measuring the greatest distance between opposite points on such a cross-sectional area. It should and would be well understood by one of ordinary skill in this particular art that the actual side curtain measured does not have to be stored in such a specific rolled manner in practice, only that, in order to assess the rolled packing volume in terms of diameter compared with depth, the target side curtain should be first laid flat and then rolled into a substantially cylindrical shape with the subsequent measurement of diameter then taken.

Thus, in one non-limiting example, a 2 meter long cylindrical roofline storage container, the necessary volume of such a container would equal about 830 cm$^3$.(with the volume calculated as 2[Pi]radius$^2$) Standard rolled packing diameters are at least 25 millimeters for commercially available side curtain airbag cushions (due to the thickness of the required coating to provide low permeability characteristics). Thus, the required cylindrical container volume would be at least 980 cm$^3$. Preferably, the rolled diameter of the inventive airbag cushion during storage is at most 20 millimeters (giving a packed volume of about 628 cm$^3$) (and up to 23 millimeters and as low as possible, for example, about 16 millimeters) which is clearly well below the standard packing volume. Of course, the ability to provide very low packing volumes in directly related to the thickness of coating applied to the airbag itself, as well as, possibly, the denier fibers utilized to produce the bag itself. The lower the denier, the thinner the bag construction, and thus, the potential for lower packing volumes. In relation, then, to the depth of the airbag cushion upon inflation (i.e., the length the airbag extends from the roofline down to its lowest point along the side of the target automobile, such as at the windows), a packing volume equal to the quotient of the particular bag's packed diameter (again in its rolled state although any other packing configuration, such as "accordion-style," "Z-fold", and the like, may be utilized as well as rolling in actual practice) divided by inventive airbag cushion's depth (which is often, though not required to be measured, at approximately 17 inches or 431.8 millimeters) should be at most 0.05. Preferably this factor should be at most 0.486 (21 millimeter diameter), more preferably at most about 0.0463 (20 millimeters) or 0.044 (19 mm), or 0.0417 (18 mm), or 0.0394 (17 millimeters). Most preferably, the denier fibers utilized are about 420 on average and thus with a coating add-on amount of about 0.8 ounces/square yard provides a packing diameter of about 18 millimeters (and thus a packing volume factor of about 0.0417).

The prior art, having extremely thick coatings with relatively high denier fibers (420 and higher) provides, at best, a packing diameter of about 24 millimeters which thus provides (with a coating in excess of 4.0 ounces per square yard, generally) a packing volume factor of about 0.0556, well above the 0.05 limit taught above. As discussed above, with lower average denier fibers utilized within the subject side curtain airbag, the packing volume may be reduced. Such as within the scope of this invention as the primary, though not only, aim of reducing such packing volume is to provide an highly effective (i.e., very low permeability), low add-on coating to the target side curtain airbag. Of course, the aforementioned range of factors does not require the airbag depth to be at a standard of 17 inches, and is primarily a function of coating thickness, and thus add-on weight, as well as yarn denier. As should be evident, however, longer (deeper) bags would require greater diameters in packing within a cylindrical storage capsule.

Surprisingly, it has been discovered that any elastomer with a tensile strength of at least 2,000 psi and an elongation at break of at least 180% coated onto and over both sides of a side curtain airbag fabric surface at a weight of at most 3.0 ounces per square yard, and preferably between 0.8 and 2.0, more preferably from 0.8 to about 1.5, still more preferably from 0.8 to about 1.2, and most preferably about 0.8 ounces per square yard, provides a coated airbag cushion which passes both the long-term blocking test and long-term oven aging test with very low, and extended permeability upon and after inflation. This unexpectedly beneficial type and amount of coating thus provides an airbag cushion which will easily inflate after prolonged storage and will remain inflated for a sufficient amount of time to ensure an optimum level of safety within a restraint system. Furthermore, it goes without saying that the less coating composition required, the less expensive the final product. Additionally, the less coating composition required will translate into a decrease in the packaging volume of the airbag fabric within an airbag device. This benefit thus improves the packability for the airbag fabric.

While the invention will be described and disclosed in connection with certain preferred embodiments and practices, it is in no way intended to limit the invention to those specific embodiments, rather it is intended to cover equivalent structures structural equivalents and all alternative embodiments and modifications as may be defined by the scope of the appended claims and equivalence thereto.

DETAILED DESCRIPTION OF THE
PREFERRED EMBODIMENTS

Two potentially preferred elastomer compositions of this invention was preferably produced in accordance with the following Tables:

TABLE 1

Standard Water–Borne Elastomer Composition

| Component | Parts (per entire composition) |
|---|---|
| Resin (30–40% solids content in water) | 100 |
| Natrosol ® 250 HHXR (thickener) | 10 |
| Irganox ® 1010 (stabilizer) | 0.5 |
| DE-83 R (flame retardant) | 10 |

TABLE 2

Standard Solvent–Borne Elastomer Composition

| Component | Parts (per entire composition) |
| --- | --- |
| Resin (30–40% solids content in solvent) | 100 |
| Irganox ® 1010 (stabilizer) | 0.5 |
| DE-83 R (flame retardant) | 10 |

TABLE 3

Standard Solvent–Borne Elastomer Composition

| Component | Parts (per entire composition) |
| --- | --- |
| Resin (25–40% solids content in solvent) | 100 |
| Irganox ® 1010 (stabilizer) | 0.5 |
| DE-83 R (flame retardant) | 10 |
| Desmodur CB-75 (adhesion promoter) | 2 |

(The particular resins are listed below in Table 4 and thus are merely added within this standard composition in the amount listed to form preferred embodiments of the inventive coating formulation).

The compounded compositions exhibited viscosities measured to be about 15,000 centipoise by a Brookfield viscometer. Once compounding was complete, the individual formulations were applied to separate articles being both sides of one-piece Jacquard woven airbags (having 420 denier nylon 6,6 yarns therein) as discussed within the Sollars, Jr. application noted above. Such applications were performed through a fixed gap coating procedure. The bag was then dried at an elevated temperature (about 300° F. for about 3 minutes) and thus form to form the necessarily thin coatings. As noted above, scrape coating may also be followed to provide the desired film coating; however, fixed gap coating provides the desired film thickness uniformity on the bag surface and thus is preferred. Scrape coating, in this sense, includes, and is not limited to, knife coating, in particular knife-over-gap table, floating knife, and knife-over-foam pad methods. The final dry weight of the coating is preferably from about 0.6–3.0 ounces per square yard or less and most preferably 0.8–1.5 ounces per square yard or less. The resultant airbag cushion is substantially impermeable to air when measured according to ASTM Test D737, "Air Permeability of Textile Fabrics," standards.

In order to further describe the present invention the following non-limiting examples are set forth. These examples are provided for the sole purpose of illustrating some preferred embodiments of the invention and are not to be construed as limiting the scope of the invention in any manner. These examples involve the incorporation of the below-noted preferred elastomers within the coating formulations of TABLES 1–3, above.

Each coated bag was first subjected to quick inflation to a peak pressure of 30 Psi. Air leakage (SCFH) of the inflated bag was then measured at 10 Psi pressure. The characteristic leak-down time t(sec) was calculated based on the leakage rate and bag volume.

TABLE 4

| Example Number/Elastomer | Tensile Strength (Psi) | Elongation at break (%) | T (sec). Before aging | T (sec.) Post-aging* | Coating add-on weight (oz/yd2) |
| --- | --- | --- | --- | --- | --- |
| 1. Impranil ® 85 UD | 6000 | 400 | 18.1 | 16.3 | 0.8 |
| 2. Ex 51–550 | 3100 | 320 | 110.2 | 105 | 0.8 |
| 3. Impranil ® ELH | 7200 | 300 | 120.2 | 125 | 0.9 |
| 4. Ru ® 41–710 | 7000 | 600 | 27.3 | 26.4 | 0.8 |
| 5. Ru ® 40–350 | 7000 | 500 | 34.4 | 36.2 | 0.8 |
| 6. Bayhydrol ® 123 | 6000 | 300 | 8.6 | 5.7 | 0.8 |
| 7. Dow Corning 3625** | 700 | 90 | <2 | <2 | 2.1 |
| 8. Silastic 94–595-HC** | 1400 | 580 | <2 | <2 | 1.8 |
| 9. Ru ® 40–415 | 5000 | 180 | <2 | <2 | 0.8 |
| 10. Sancure ® 861 | 3000 | 580 | 25.2 | <2 | 0.8 |
| 11. Witcobond ® 290H | 6000 | 600 | 28.4 | <2 | 0.8 |

*Aging conditions: 107° C. oven aging for 16 days, followed by 83° C. and 95% relative humidity aging for 16 days.
**The resins are silicone rubbers.

As noted above, Examples 1–6 work extremely well and are thus within the scope of this invention. Examples 10 and 11 show some limitations, polyester based elastomers (Witcobond® 290H) exhibit excellent heat aging (oxidation) stability but tend to hydrolyze easily at high humidity; polyether based elastomers (Sancure® 861) have excellent hydrolysis resistance, but poor oxidation performance. However, these elastomers have proven to be acceptable permeability reducers at higher add-on weights below the maximum of 3.0 ounces per square yard. Furthermore, although silicones show excellent resistance to heat aging and hydrolysis (humidity aging), they, however, possess limited tensile strength and tear resistance resistance. Natural rubber, SBR, chloroprene rubbers and others containing unsaturated carbon double bonds have excellent hydrolysis resistance. But the unsaturated carbon double bond that gives their elasticity oxidizes readily and the properties of the rubber change after heat aging. Elastomers that have good physical properties and excellent resistance to hydrolysis and oxidation are preferred for this application. Polyurethanes based on polycarbonate soft segments are the preferred materials for this application.

The airbag of Example 3 exhibited a sliding coefficient of friction constant of roughly 0.6. A comparative thick silicone-coated side curtain airbag which included a non-woven layer, exhibited a constant of about 0.8.

BRIEF DESCRIPTION OF THE DRAWINGS

FIG. 1 is a cross-sectional view of an inventive all-woven inflatable fabric showing the preferred double and single layer areas including two separate single layer areas.

FIG. 2 is a weave diagram illustrating a potentially preferred repeating pick pattern formed using repeating plain weave and basket weave four-pick arrangements.

FIG. 3 depicts the side, inside view of a vehicle prior to deployment of the inventive side curtain airbag.

FIG. 4 depicts the side, inside view of a vehicle after deployment of the inventive side curtain airbag.

FIG. 5 depicts a side view of a side curtain airbag.

FIG. 6 provides a side view of a side curtain airbag container.

FIG. 7 provides a cross-sectional perspective of the stored airbag within the container of FIG. 6.

DETAILED DESCRIPTION OF THE DRAWINGS

Turning now to the drawings, in FIG. 1 there is shown a cross-section of a preferred structure for the double fabric layers 12, 14, 18, 20, 24, 26 and single fabric layers 16, 22 of the inventive inflatable fabric 10. Weft yarns 28 (exhibiting preferably deniers of about 420 each) are present in each of these fabric layer areas 12, 14, 16, 18, 20, 22, 24, 26 over and under which individual warp yarns 38, 40, 42, 44 (also exhibiting deniers preferably of about 420) have been woven. The double fabric layers 12, 14, 18, 20, 24, 26 are woven in plain weave patterns. The single fabric layers 16, 22 are woven in basket weave patterns. Four weft yarns each are configured through each repeating basket weave pattern within this preferred structure; however, anywhere from two to twelve weft yarns may be utilized within these single fabric layer areas (seams) 16, 22. The intermediate double fabric layer areas 18, 20 comprise each only four weft yarns 28 within plain weave patterns. The number of such intermediate weft yarns 28 between the single fabric layer areas 16, 22 must be in multiples of two to provide the maximum pressure bearing benefits within the two seams 16, 22 and thus the lowest possibility of yarn shifting during inflation at the interfaces of the seams 16, 22 with the double fabric layer areas 12, 14, 24, 26.

FIG. 2 shows the weave diagram 30 for an inventive fabric which comprises two irregularly shapes concentric circles as the seams. Such a diagram also provides a general explanation as to the necessary selection criteria of placement of basket-weave patterns within the fabric itself. Three different types of patterns are noted on the diagram by different shades. The first 32 indicates the repeated plain weave pattern throughout the double fabric layers (12, 14, 18, 20, 24, 26 of FIG. 1, for example) which must always initiate at a location in the warp direction of 4X +1, with X representing the number of pick arrangement within the diagram, and at a location in the fill direction of 4X+1 (thus, the pick arrangement including the specific two-layer plain-weave-signifying-block 32 begins at the block four spaces below it in both directions). The second 34 indicates an "up-down" basket weave pattern wherein an empty block must exist and always initiate the basket-weave pattern at a location in the warp direction of 4X+1, with X representing the number of repeating pick arrangements within the diagram, and at a location in the fill direction of 4X+1, when a seam (such as 16 and 22 in FIG. 1) is desired (thus, the pattern including the pertinent signifying "up-down" block 34 includes an empty block within the basket-weave pick arrangement in both the warp and fill directions four spaces below it). The remaining pattern, which is basically a "down-up" basket weave pattern to a single fabric layer (such as 16 and 22 in FIG. 1) is indicated by a specifically shaded block 36. Such a pattern must always initiate at a location in the warp direction of 4X+1 and fill of 4X+3, or warp of 4X+3 and fill of 4X+1, when a seam is desired. Such a specific arrangement of differing "up-down" basket weave 34 and "down-up" basket weave 36 pattern is necessary to effectuate the continuous and repeated weave construction wherein no more than three floats (i.e., empty blocks) are present simultaneously within the target fabric structure. Furthermore, again, it is believed that there has been no such disclosure or exploration of such a concept within the inflatable fabric art.

As depicted in FIG. 3, an interior of a vehicle 110 prior to inflation of a side curtain airbag (not illustrated) is shown. The vehicle 110 includes a front seat 112 and a back seat 114, a front side window 116 and a back-side window 118, a roofline 120, within which is stored a cylindrically shaped container 122 comprising the inventive side curtain airbag (not illustrated). Also present within the roofline 120 is an inflator assembly 124 which ignites and forces gas into the side curtain airbag (126 of FIG. 4) upon a collision event.

FIG. 4 shows the inflated side curtain airbag 126. As noted above, the airbag 126 is coated with at most 2.5 ounces per square of a coating formulation (not illustrated), preferably polyurethane polycarbonate. The inventive airbag 126 will remain sufficiently inflated for at least 5 seconds, and preferably more, as high as at least 20 seconds, most preferably.

FIG. 5 shows the side curtain airbag 126 prior to storage in its uninflated state within the roofline cylindrically shaped container 122. The thickness of the airbag 126, measured as the packing diameter (as in FIG. 7, below) as compared with the depth of the airbag measured from the roofline cylindrically shaped container 122 to the bottom most point 128 of the airbag 126 either in its uninflated or inflated state at most 0.05. Larger factors are possible with higher add-on coating weights and larger yarns. Smaller yarns may be utilized with lower or larger add-on coating weights as well which meet this limitation as well.

FIGS. 6 and 7 aid in understanding this concept through the viewing of the rolled airbag 126 as stored within the container 122 along line 2. The diameter measurement of the airbag 126 of Example 3, above, is roughly 20 millimeters. The standard depth of side curtain airbags is roughly 17 inches, or about 431.8 millimeters. Thus, the preferred packing volume factor is about 0.046 (20 mm/431.8 mm). A comparative silicone-based thick coating add-on weight of about 4.0 ounces per square yard provided a diameter of about 25 millimeters for a factor of about 0.0579 (25 mm/431.8 mm).

There are, of course, many alternative embodiments and modifications of the present invention which are intended to be included within the spirit and scope of the following claims. In particular, it is to be understood that any side curtain airbag of any production method and structure which exhibits low permeability measurements with very low coating add-on amounts, and specifically meets the packing volume (be it as a rolled fabric, or packed accordion-style, or other packed configuration) limitations noted above is within the scope of this invention.

What is claimed is:

1. A coated side curtain airbag exhibiting a packing volume factor of at most about 0.05; wherein at least a portion of said coated side curtain airbag is coated with an elastomeric coating; and wherein said coated side curtain airbag exhibits a characteristic leak-down time after inflation of at least 5 seconds.

2. The airbag of claim 1 wherein said airbag comprises fibers possessing an average denier of at most 525.

3. The airbag of claim 2 wherein said fibers possess an average denier of at most 420.

4. The airbag of claim 3 wherein said fiber possess an average denier of at most 315.

5. A coated side curtain airbag exhibiting a packing volume factor of at most about 0.05; wherein at least a portion of said coated side curtain airbag is coated with an elastomeric coating; wherein said coated side curtain airbag exhibits a characteristic leak-down time after inflation of at least 5 seconds; and wherein said inflatable fabric comprises at least two layers of fabric in certain discrete areas of the fabric and at least one single fabric layer at a discrete area within said fabric, wherein the weave diagram for such an inflatable fabric does not exhibit more than three consecutive unfilled blocks in any row or column.

6. The airbag of claim 5 wherein said elastomeric composition comprises polyurethane.

7. The airbag of claim 5 wherein said coated fabric is woven and comprises polyamide yarns.

8. The airbag of claim 7 wherein said polyamide yarns are formed from nylon 6,6 fiber.

9. The airbag of claim 8, wherein said polyamide yarns are multifilament yarns characterized by an average linear density of between about 210 and 630 denier.

10. The airbag of claim 9, wherein said multifilament yarns are characterized by a filament linear density of about 4 denier per filament or less.

11. The airbag of claim 6, wherein said elastomeric polyurethane composition is polycarbonate polyurethane.

12. The airbag of claim 5 wherein said packing volume factor is at most about 0.048.

13. The airbag of claim 12 wherein said packing volume factor is at most about 0.046.

14. The airbag of claim 13 wherein said packing volume factor is at most about 0.044.

15. The airbag of claim 14 wherein said packing volume factor is at most about 0.041.

16. The airbag of claim 15 wherein said packing volume factor is at most about 0.393.

17. A coated side curtain airbag exhibiting a packing volume factor of at most about 0.05; wherein at least a portion of said coated side curtain airbag is coated with an elastomeric coating; wherein said coated side curtain airbag exhibits a leak-down time after inflation of at least 5 seconds; and wherein said inflatable fabric comprises at least two layers of fabric in certain discrete areas of the fabric and at least one single fabric layer at a discrete area within said fabric, wherein only two separate weave densities are present within the area directly adjacent to said single fabric layer.

18. The airbag of claim 17 wherein said elastomeric composition comprises polyurethane.

19. The airbag of claim 17 wherein said coated fabric is woven and comprises polyamide yarns.

20. The airbag of claim 19 wherein said polyamide yarns are formed from nylon 6,6 fiber.

21. The airbag of claim 20, wherein said polyamide yarns are multifilament yarns characterized by an average linear density of between about 210 and 630 denier.

22. The airbag of claim 21, wherein said multifilament yarns are characterized by a filament linear density of about 4 denier per filament or less.

23. The airbag of claim 18, wherein said elastomeric polyurethane composition is polycarbonate polyurethane.

24. The airbag of claim 17 wherein said packing volume factor is at most about 0.048.

25. The airbag of claim 24 wherein said packing volume factor is at most about 0.046.

26. The airbag of claim 25 wherein said packing volume factor is at most about 0.044.

27. The airbag of claim 26 wherein said packing volume factor is at most about 0.041.

28. The airbag of claim 27 wherein said packing volume factor is at most about 0.393.

29. A coated side curtain airbag exhibiting a packing volume factor of at most about 0.05; wherein at least a portion of said coated side curtain airbag is coated with an elastomeric coating; wherein said coated side curtain airbag exhibits a leak-down time after inflation of at least 5 seconds; and wherein said inflatable fabric comprises at least two layers of fabric in certain discrete areas of the fabric and at least one narrow single fabric layer at least two discrete areas within said fabric, wherein said at least one narrow single fabric layer is formed solely from a basket weave pattern of an even number of yarns, at most 12 yarns in width, wherein at least two discrete narrow areas of single fabric layers are present within said inflatable fabric, wherein said at least two areas of single fabric layers are separated by an area of at least two layers of fabric, and wherein the width of each single layer is from 4 to 8 yarns in length.

30. The airbag of claim 29 wherein said elastomeric composition comprises polyurethane.

31. The airbag of claim 29 wherein said coated fabric is woven and comprises polyamide yarns.

32. The airbag of claim 31 wherein said polyamide yarns are formed from nylon 6,6 fiber.

33. The airbag of claim 32, wherein said polyamide yarns are multifilament yarns characterized by an average linear density of between about 210 and 630 denier.

34. The airbag of claim 33, wherein said multifilament yarns are characterized by a filament linear density of about 4 denier per filament or less.

35. The airbag of claim 30, wherein said elastomeric polyurethane composition is polycarbonate polyurethane.

36. The airbag of claim 29 wherein said packing volume factor is at most about 0.048.

37. The airbag of claim 36 wherein said packing volume factor is at most about 0.046.

38. The airbag of claim 37 wherein said packing volume factor is at most about 0.044.

39. The airbag of claim 38 wherein said packing volume factor is at most about 0.041.

40. The airbag of claim 39 wherein said packing volume factor is at most about 0.393.

* * * * *